(12) United States Patent
Johnson

(10) Patent No.: US 11,903,786 B1
(45) Date of Patent: Feb. 20, 2024

(54) DEVICES, SYSTEMS AND METHODS FOR TEMPORARY ATTACHMENT OF A SAFETY LINE TO DENTAL RESTORATIONS AND APPLIANCES

(71) Applicant: Timothy Johnson, Webster, WI (US)

(72) Inventor: Timothy Johnson, Webster, WI (US)

( * ) Notice: Subject to any disclaimer, the term of this patent is extended or adjusted under 35 U.S.C. 154(b) by 0 days.

(21) Appl. No.: 18/051,650

(22) Filed: Nov. 1, 2022

(51) Int. Cl.
*A61C 5/80* (2017.01)
*A61C 15/04* (2006.01)

(52) U.S. Cl.
CPC .............. *A61C 5/80* (2017.02); *A61C 15/041* (2013.01)

(58) Field of Classification Search
CPC ................................ A61C 5/80; A61C 15/041
See application file for complete search history.

(56) References Cited

U.S. PATENT DOCUMENTS

| | | | | |
|---|---|---|---|---|
| 4,773,857 A | * | 9/1988 | Herrin | A61C 5/82 433/180 |
| 4,834,654 A | * | 5/1989 | Nussbaum | A61C 3/00 294/212 |
| 4,975,053 A | * | 12/1990 | Hofsess | A61C 5/70 433/25 |
| 5,030,092 A | | 7/1991 | Cokeley | |
| 5,197,877 A | * | 3/1993 | Andrew | A61C 3/16 433/153 |
| 5,256,064 A | * | 10/1993 | Riihimaki | A61C 3/00 433/141 |
| 5,476,381 A | * | 12/1995 | Dragan | A61C 3/06 30/169 |
| 5,669,771 A | | 9/1997 | Lee | |
| 7,066,735 B1 | * | 6/2006 | Gasporra | A61C 5/90 433/140 |
| 2005/0203456 A1 | | 9/2005 | Dansie | |

OTHER PUBLICATIONS

Triodent, Get a grip on restorations with Triodent's Griptab, Practicon Fall/Winter 2010 Catalog, center fold, Greenville, NC, USA.
Pubmed Central, Therapeutics and Clinical Risk Management, article, published online May 23, 2012, doi 10.2147/TCRM. S30639, Figure 2, 8:245-252, http://www.ncbi.n.m.nih.gov/pmc/articles/PMC3373200/figure/f2-tc . . . , USA.

* cited by examiner

*Primary Examiner* — Ralph A Lewis
(74) *Attorney, Agent, or Firm* — Anthony J. Bourget

(57) ABSTRACT

Devices, systems, and methods for handling dental restorations or dental appliances, including a device having an adhesive at one side of a flexible substrate which peels from a strip to connect to a dental appliance, the device further including an abrasive at an opposite side of the substrate, and in further aspects a tab section devoid of adhesive to accommodate easy grasp and lift of the device for removal from the dental appliance, and in further aspects a string attached to the tab.

24 Claims, 9 Drawing Sheets

DEVICES, SYSTEMS AND METHODS FOR TEMPORARY ATTACHMENT OF A SAFETY LINE TO DENTAL RESTORATIONS AND APPLIANCES

DESCRIPTION

BACKGROUND OF THE INVENTION

Apparatuses have been used to secure a device or safety line to dental restorations and appliances. One such dental device safety line apparatus is found in U.S. Pat. No. 5,030,092 issued to Ricky R. Cokeley in 1991. Another product includes Triodent's Griptab™ device from 2010, no longer available in the market, which cemented a device to the appliance. While such apparatus and techniques may have benefits, there is room for improvement.

SUMMARY OF THE INVENTION

There is a need for a device which allows a practitioner to easily and swiftly apply a string to a dental appliance such that the device sufficiently holds onto the appliance, is easy to remove from the appliance when desired, is of a configuration to minimize interference with dental procedures when connected to the appliance, and provides for safely handling the dental appliance for a practitioner having a gloved hand. No special cements or time curing glues or solvents or preparations are required to connect a string of the present device to the appliance, or to remove the string when desired. The present device does not interfere with dental procedures, is safe and easy to handle, and does not impact the integrity of the appliance. In one aspect the present invention pertains to an easy-to-use device to secure a safety string or floss to a dental appliance. The device includes a pad having a peel strip which allows convenient exposer of an adhesive for adhering the pad to a crown or other appliance. In aspects the adhesive is pressure sensitive which avoids having to prepare cements or undergo special curing or preparation of the device or dental appliance. Opposite the adhesive is a textured surface or abrasive which allows for improved gripping of the pad and connected dental appliance to which the pad is attached. The pad is planar and exhibits a low profile when applied to a surface of a dental appliance to avoid interference with a dental practitioner working with the dental appliance positioned within a patient's mouth. In aspects the tab includes a string-receiving port to receive a string, and in other aspects includes a string so the dental appliance may be constrained from falling into a patient's throat or elsewhere, and may be retrieved in the event of a mishap.

In further aspects, the invention includes a dental device which comprises a safety string attached to a low profile pad which is easily applied to a dental appliance by removal of a peel strip to reveal a pressure sensitive adhesive of the pad. The pad includes an adhesive side and a textured side. The adhesive side is attached to a dental appliance and imparts substantial strength between the safety string and the dental appliance. The textured side allows the practitioner to better handle a dental restoration or appliance and prevents or reduces slippage, and possible ingestion or inhalation of the dental restoration or appliance, such as a crown. A tab, which includes a portion of the pad which is devoid of adhesive, is configured to be pulled so that safe and convenient removal may be made of the pad from the dental appliance after the dental appliance is set within a mouth of a patient. In aspects the device is flexible and generally planar, positionable flat along a surface of the dental appliance. In aspects the adhesive is a pressure-sensitive adhesive, and if further aspects the adhesive is a stretching releasing adhesive.

In aspects the device includes a peel strip from which the device is removed to expose the adhesive until use. The peel strip may include a paper or plastic substrate to prevent exposure of the adhesive and is connected to the pad via the adhesive. The adhesive side of the pad is placed on a surface of the dental restoration or dental appliance in an area that will not interfere during the appliance-seating (such as a crown) procedure. The device remains attached to the restoration until the dental restoration is permanently affixed in the oral cavity of the patient. After the dental restoration has been permanently affixed the practitioner will use a common dental instrument, such as a cotton pilers, to pull on the tab of the device to remove the dental device from the dental appliance.

In further aspects the invention includes a peel strip having at least two pads, both pads having a top textured surface and a bottom surface having an adhesive, at least one of the pads has a string connected to the pad. In aspects the textured surface includes an abrasive, and the adhesive is a pressure sensitive adhesive. In aspects the abrasive is sandpaper, and the adhesive is a stretching releasing adhesive.

In further aspects the invention includes a method of peeling a pad from a peel strip, the pad having a textured first surface and an adhesive second surface, the pad having a flat, low-profile and an outer perimeter which is contained within a profile of a dental attachments such as a crown, the method further including pressing the pad against a dental appliance. In aspects the pad may include an already-connected string, or the method may further include securing a string to the pad at a port, prior to securing the pad to the appliance.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
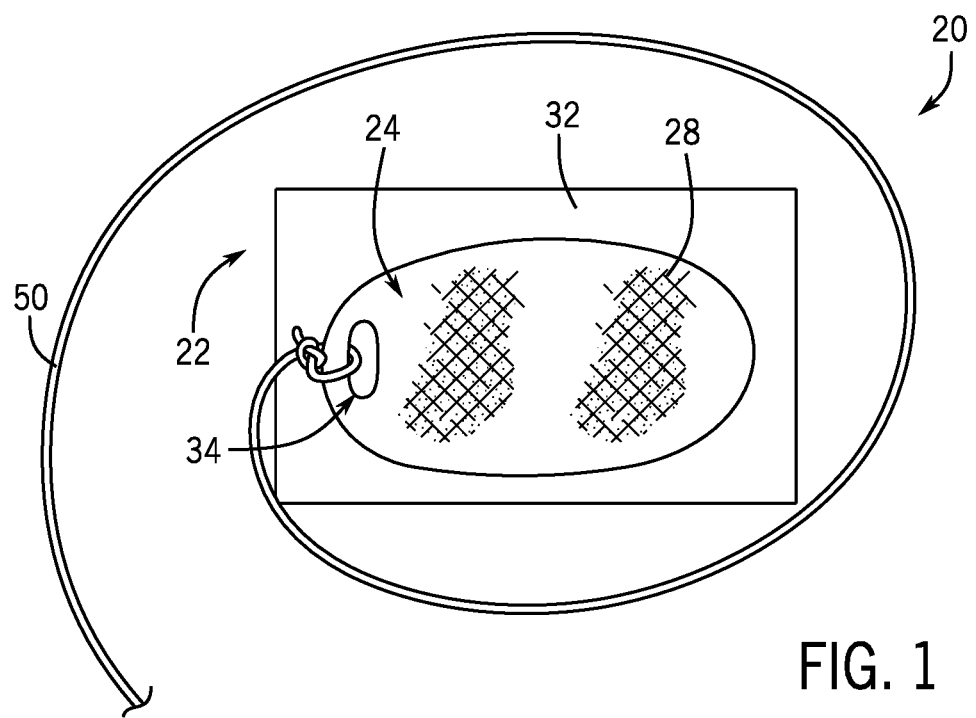
FIG. 1 is a top view of a device for use in conjunction with a dental restoration or dental appliance in accordance with aspects of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-21, aspects of the devices, systems and methods of the invention are shown. Device 20 is detachably connectable to a dental restoration or dental appliance and includes features which prevent slippage and possible ingestion or inhalation of the dental restoration or appliance. The dental restoration or appliance may include appliances such as crowns or other restorations or appliances. The dental crowns may comprise porcelain material, porcelain fused to metal, ceramic material, stainless steel, and other appliances such as orthodontic bands or brackets, dental veneers, dental endodontic instruments, among other devices. These dental crowns, appliances and/or restorations are hereafter referred to as dental appliance 40. The device 20 (and connected dental appliance) is gripped or handled by a gloved practitioner and includes a textured surface (in some aspects such surface includes sandpaper) and a safety string for controlling or handling the appliance 40.

FIG. 1 is a top view of a device 20 for use in conjunction with a dental appliance 40 in accordance with aspects of the invention. Device 20 includes a base or pad 22 having a top surface 24 and a bottom surface 26. Top surface 24 is textured or has or includes an abrasive 28, and the bottom surface 26 is or includes an adhesive 30. Pad 22 of device 20 is detachably connected to a peel strip 32 at bottom surface 26. Peel strip 32 may be a flexible smooth sheet which releases from the adhesive 30. Strip 32 may be made of paper or plastic or other material to allow for easy release while also protecting the adhesive 30 from exposure. Peeling away peel strip 32 exposes the adhesive 30 which allows the device 20 to be adhered to a dental appliance 40. In one aspect device 20 includes a string connecting port 34 defined at pad 22. Port 34 receives a string 50 such as dental floss which may be used for flossing. String 50 may be tied to device 20 via port 34, and allows a practitioner to more easily retrieve the device 20 and any connected appliance 40 if the appliance 40 is dropped or slides out of position. In other aspects string 50 is sewn, stitched, woven or embedded into pad 22, with or without use of a string connecting port 34. In aspects, device 20 is provided without a string 50 yet with a string connecting port 34 to allow a practitioner to apply a string 50 at the port 34 as desired. The practitioner may select any desired length of string 50 to apply. In aspects, device 20 includes a string 50 having a length of about 2 to 20 inches. Various other lengths of string 50 may be used. In aspects, port 34 may be reinforced with plastic or a hardened ring, or stitching or other thickened material positioned around the port 34 to prevent tearing.

Figure 2:
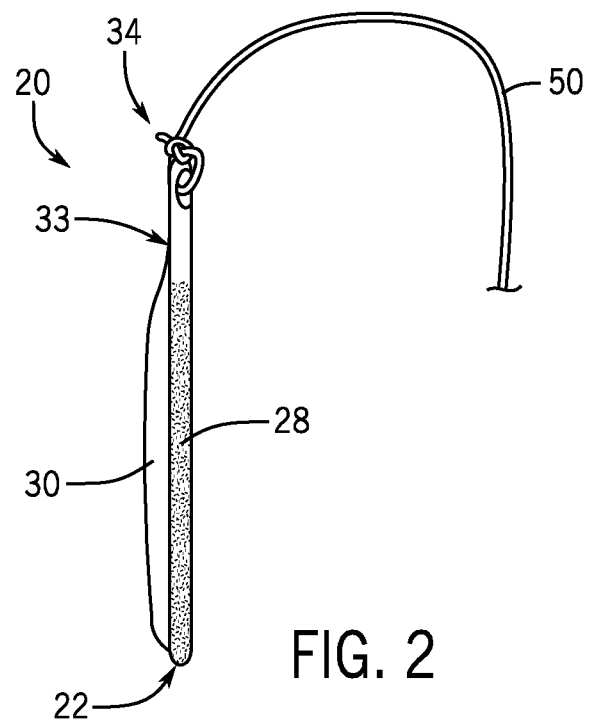
FIG. 2 is a side view of the device of FIG. 1 with a portion removed for clarity.

FIG. 2 is a side view of one aspect of the device 20 without a peel strip 32 (or with peel strip 32 removed) and with string 50 shown in short-form for illustrative purposes. In this view the pad 22 comprises two layers, with a textured layer and an adhesive layer. It may be appreciated that pad 22 may include more (or less) than two layers, with some layers being substrates to support adhesive or textured materials, while other layers themselves comprise adhesive or textured materials. In aspects, pad 22 may comprise a single foam layer (such as an acrylic foam layer) with one side being textured and an opposite side being adhesive, or with one side being applied with an adhesive and/or an opposite side having a textured material. In further aspects, a layer of sandpaper, which includes paper or a substrate coated on one side with sand or other abrasive material (typically used for smoothing of surfaces or for presenting a friction surface). The paper or substrate in aspects is coated with hot glue and then sprinkled with sharp sand or other abrasive material of different degrees of fineness or grit. In aspects, the textured surface or abrasive 28 ranges between 10 and 100 grit. In one aspect the textured side includes 50 grit sandpaper. A variety of degrees of grit may be used. In aspects sand or sharp material is embedded in the pad 22 at the top surface 24, or includes an abrasive layer added to a top surface of a substrate of the pad 22. In aspects, the textured surface in a non-plastic textured surface. A surface that is otherwise a plastic surface may be slippery to a gloved hand. A surface that is otherwise non-textured, i.e., a smooth surface being free from irregularities, roughness or projections, may also be slippery to a gloved hand. In aspects the pad 22 comprises a middle base layer, a top abrasive layer, and a bottom adhesive layer. In aspects the pad 22 includes a middle base with abrasive material positioned on the top and adhesive positioned on the bottom, and a peel strip positioned on the adhesive. In other aspects the pad 22 comprises a top layer and a bottom layer. The layers, or some of them, may be mesh, woven, or non-woven. The texture of top surface 24 may also be mesh or other non-smooth material 28 to better allow a practitioner to grasp the dental appliance 40 with a gloved hand. In further aspects, pad 22 may include multiple layers. In one aspect device 20 and pad 22 are generally planar and lay flat.

Figure 3:
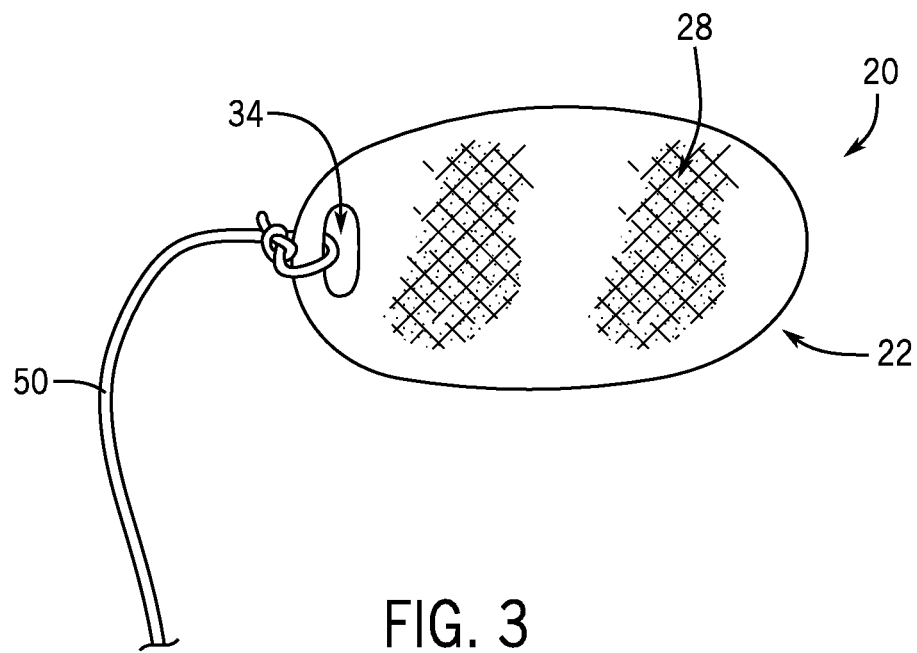
FIG. 3 is a top view of the device of FIG. 1 with a portion removed for clarity.
Figure 4:
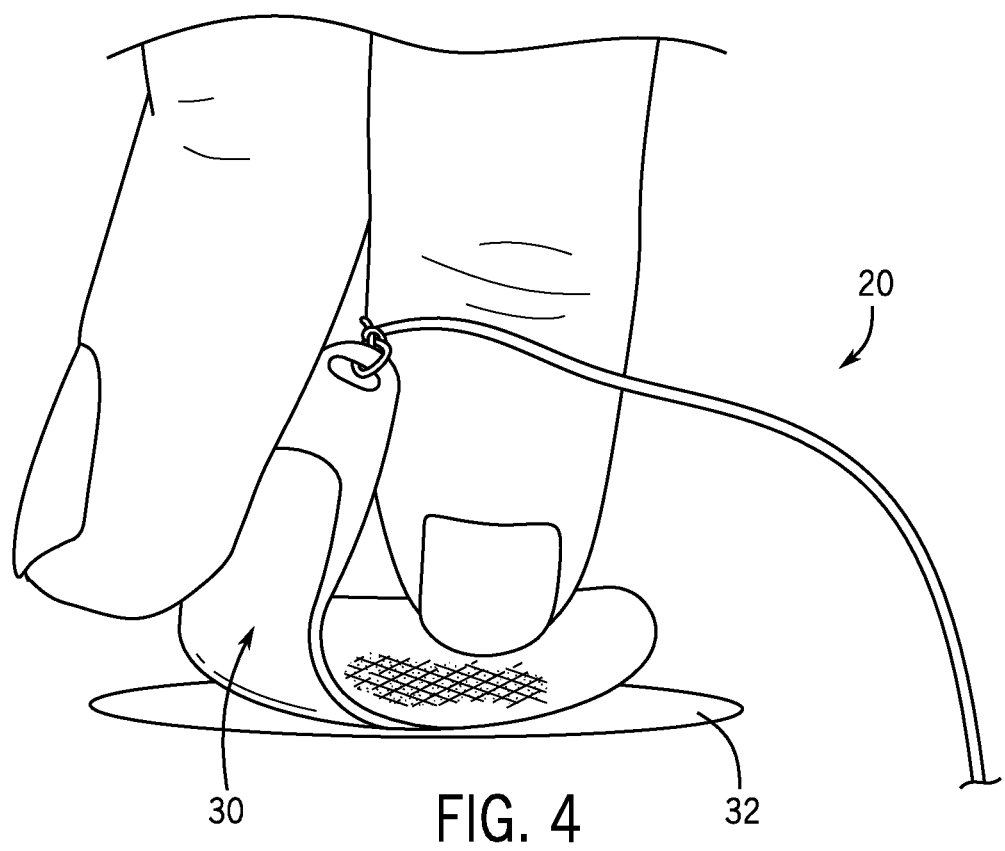
FIG. 4 is a side view of the device of FIG. 1 showing further aspects in a use mode.

FIG. 3 shows an aspect of device 20 without peel strip 32 and having a generally oval dimension. Other dimension may be used. FIG. 4 shows device 20 with peel strip 32 as a practitioner pulls upward on pad 22 to remove the pad 22 from peel strip 32. Adhesive 30 is revealed when pad 22 is pulled away from peel strip 32, and the adhesive 30 allows device 20 to be adhered to dental appliance 40.

Figure 5:
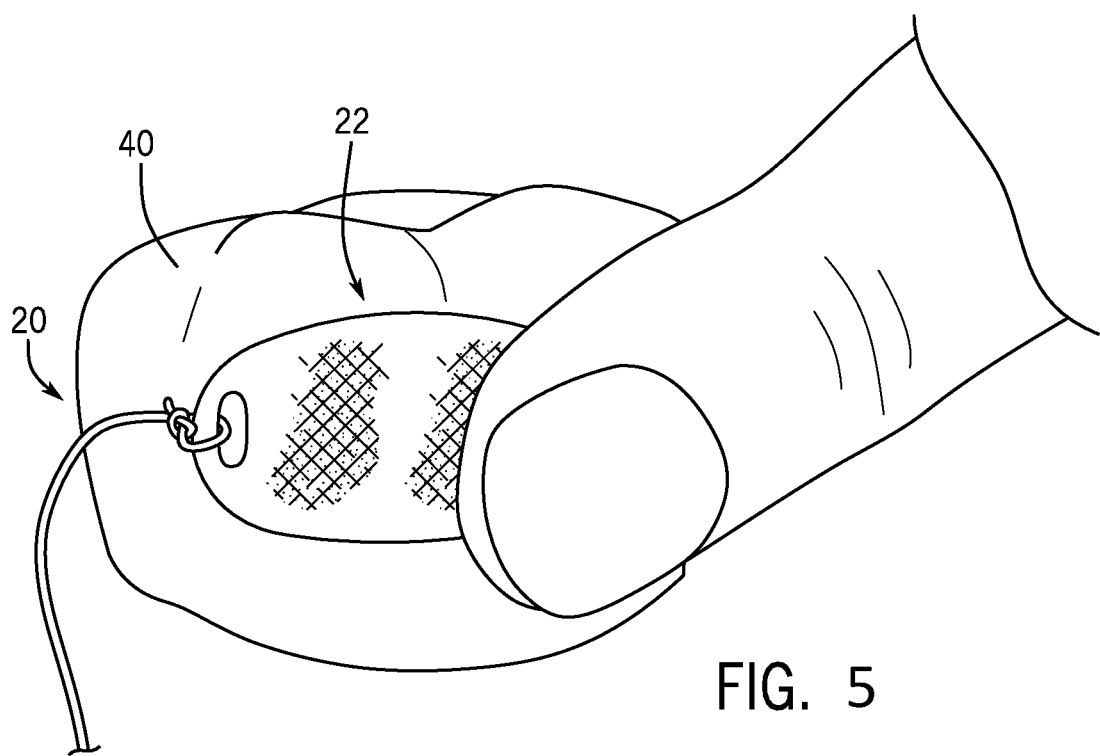
FIG. 5 is a view of the device of FIG. 3 shown in a use mode.

FIG. 5 shows pad 22 of device 20 adhered to a dental appliance 40. The practitioner presses against the top surface 24 to secure the pad 22 into position via adhesive 30. The practitioner may apply pressure against pad for several seconds to assure a strong connection between the pad 22 and appliance 40. Pad 22 is flat and does not significantly protrude outward from the dental appliance 40 (See FIG. 8). Such low profile allows for the pad 22 to be positioned at the buccal, or the patient's cheek side, without interference.

Figure 7:
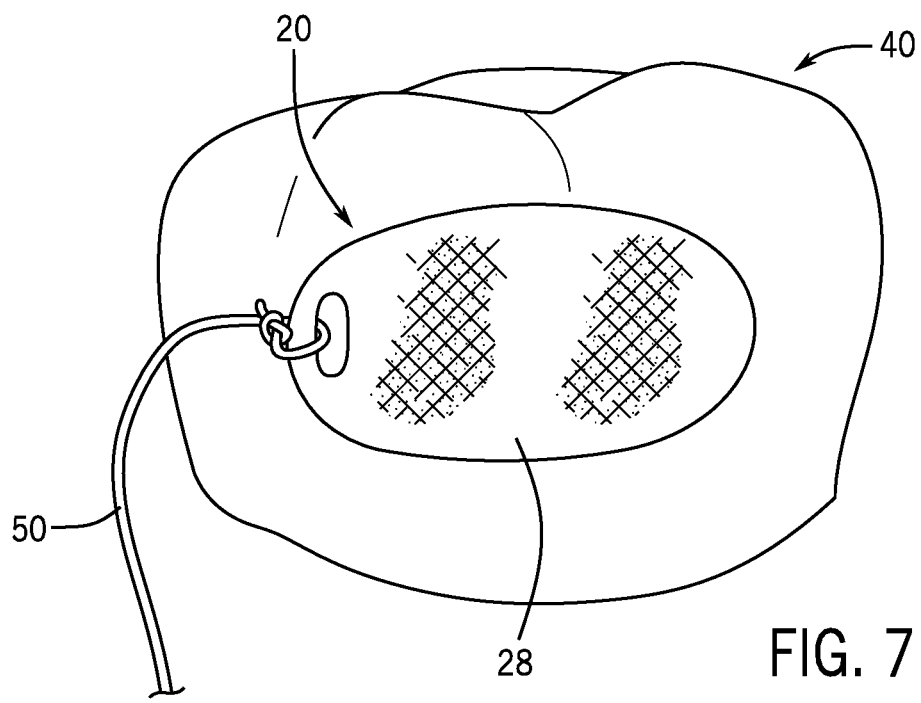
FIG. 7 is a view of the device of FIG. 3 in a use aspect.

Such low profile and positioning also allows for the string 50 to avoid interference when sampling the dental appliance 40 for proper fit (i.e., during a try-in phase of the fitting procedure which often requires repeated handling, insertion and removal of the dental appliance 40). Such low profile does not interfere with the patient's check, and with the string 50 positioned at the buccal side, neither the pad 22 nor the string 50 interfere when the patient bites down on marker paper placed between the appliance 40 and opposing top/bottom teeth. The low profile of pad 22 also allows for patient comfort because there are no outward or upstanding projections from the pad 22 that would or could otherwise poke or irritate the inside of the patient's mouth. As also shown in FIG. 5 and FIG. 7, pad 22 attaches to a side of the dental appliance 40 such that an entirety of pad 22 is positioned entirely within a perimeter of the side of the appliance 40. Such small profile further reduces the likelihood of interference of device 20 with the procedures. In aspects, device 20 and/or pad 22 has a small size dimension. In one aspect pad 22 has a length of about 1/8 inch to ¼ inch and a width of about 1/16 inch to 3/8 inch. In further aspects pad 22 has a length of about 3/8 inches and a width of about 1/8 inches. Such general size ranges allow pad 22 to fit on a side of most dental appliances 40 without extending beyond a side perimeter of the appliance 40. In aspects, pad 22 has a thickness of less than 1/32 of an inch. In some aspects, pad 22 has a thickness of about 0.6 mm to about 2.8 mm. In aspects pad 22 has a thickness of 0.6 mm to 2.8 mm.

Figure 6:
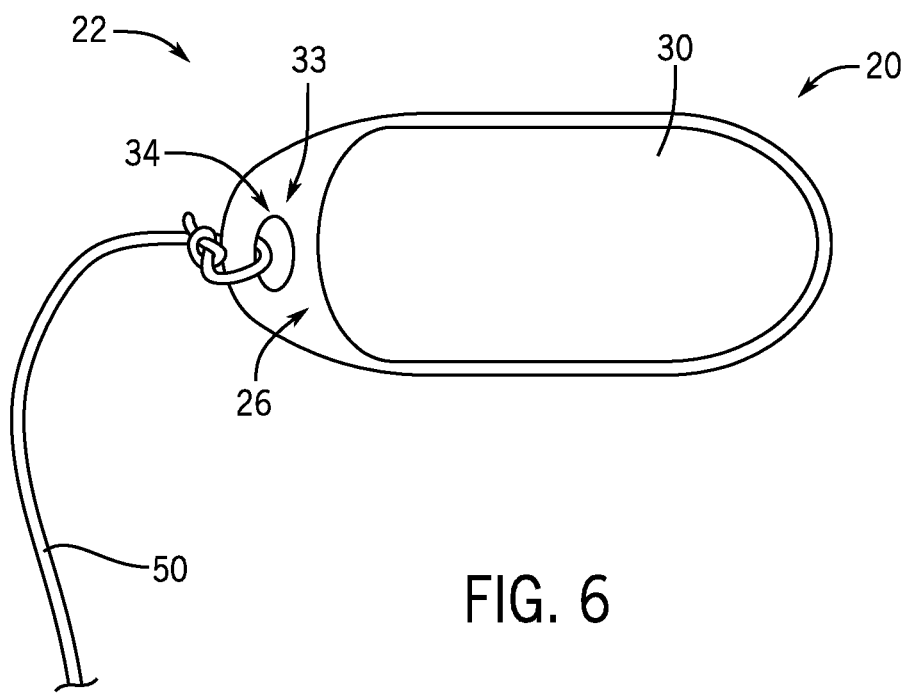
FIG. 6 is bottom section view of the device shown in FIG. 3.

FIG. 6 is a bottom view of device 20 and shows pad 22 with adhesive 30. In one aspect, an area devoid of adhesive, tab 33, is also included at a bottom surface of pad 22. The tab 33 extends outward from the adhesive portion of pad 22 and allows a practitioner to grasp tab 33 to pull upwards to release pad 22 from peel strip 32 (See FIG. 4) and also allows the practitioner to release pad 22 from dental appliance 40 (See FIG. 9). In one aspect, tab 33 includes the port 34, with or without a string 50. In one aspect, string 50 is secured to pad 22 at tab 33. In one aspect, string 50 is secured to pad via port 34. As shown in FIG. 6, adhesive 30 covers substantially a majority of the bottom of device 20, and in some aspects covers at least 80 percent of the bottom of the device 20. In further aspects adhesive 30 is applied to pad 22 as a single layer or in multiple layer sections.

Figure 9:
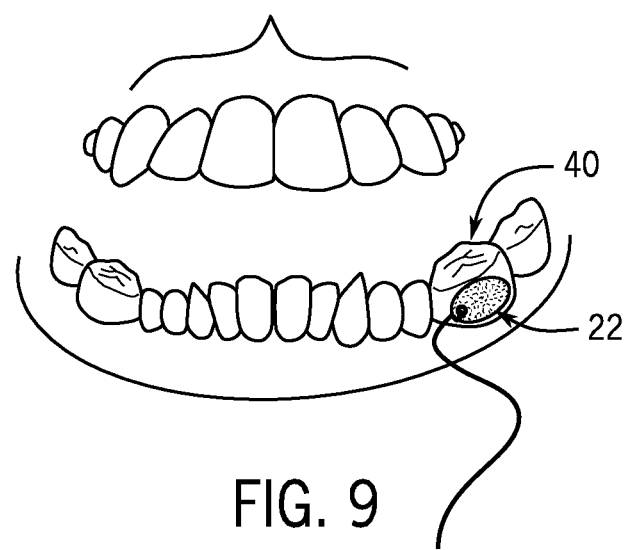
FIG. 9 is a view of the device of FIG. 3 in accordance with a further aspect of the invention.

FIG. 9 shows pad 22 positioned upon a dental appliance 40 within a mouth of a patient. String 50 extends outward from the mouth and the pad 22 is positioned to minimize or avoid interference with the fitting process of the dental appliance. If the appliance 40 were to dislodge or be dropped, the string 50 would allow the practitioner to easily retrieve the appliance 40 and prevent the appliance from falling on the ground or being inhaled or swallowed by the patient.

Figure 10:
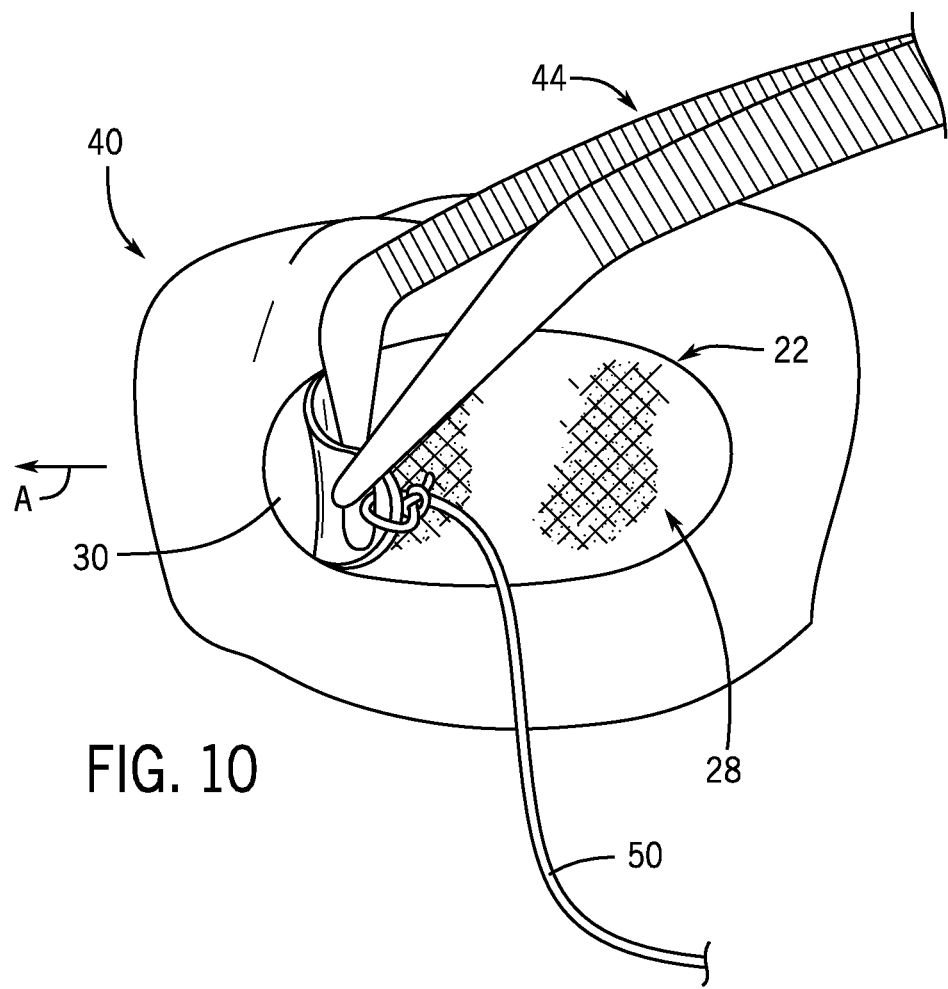
FIG. 10 is a view of the device of FIG. 3 in accordance with a further use aspect of the invention.

FIG. 10 shows pad 22 affixed to dental appliance 40 and where a practitioner utilizes a tool 44 to grasp tab 33 of device 20. Tab 33 generally aligns flush with the remainder of pad 22. Because tab 33 is devoid of adhesive and is not adhered to dental appliance 40, tab 33 may be lifted or pulled away from dental appliance 40 with ease. Practitioner may also grasp tab 33 to apply force with tool 44 to peel the remainder of pad 22 away from dental appliance 40 (i.e., peeling tab 33 back toward the remainder of pad 22 causes the adhesive/pad to separate from dental appliance 40). Adhesive that remains on appliance 40 may be easily removed by the practitioner with tool 44 or with a different tool, and without harming dental appliance 40. In aspects, given the nature of adhesive 30, such as where adhesive 30 is a pressure-sensitive adhesive and/or stretching releasing adhesive (such as adhesives found in and the products of 3M Command™ adhesive strips by 3M Company, St. Paul, Minn., Plastofix™ Formuli Force 1000 adhesive strips from Plasto S.A., tesa™Powerstrips™ from tesa AG, among others) the tab 33 may be pulled along a longitudinal direction of tab 22 (i.e., in the direction of arrow A in FIG. 10) to release pad 22 from dental appliance 40. Many or some of the adhesives may exhibit a pronounced reduction in tack during stretching detachment (i.e., a stretching releasing adhesive). The foregoing adhesives are non-limiting examples of adhesives that may be used with the pad 22. These and other adhesives conveniently allow the pad 22 to be adhered to the dental appliance 40 without the need for light-curing or cement/bonding to the appliance 40. In one aspect as shown in FIG. 10 the adhesive 30 from pad 22 will remain temporarily adhered to the dental appliance 40 (and separated from the remaining portion of pad 22 such as the abrasive or other layer or substrate of pad 22) and thereafter easily removed by the practitioner. In aspects the remaining adhesive 30 may be detached from the appliance 40 by stretching the adhesive which reduces the tack. In further aspects, the adhesive 30 will also release from the dental appliance 40 upon peeling back pad 22 or pulling pad 22 from dental appliance 40. In further aspects, tab 33 comprises a non-adhesive pull tab to facilitate stretching of the pad 22 during removal. It may be appreciated that no pre-bonding, or light-curing, or mixing of ingredients, or pre-application of materials, is required of the practitioner to utilize the adhesive 30 and pad 22. A simple removal of the peel strip 32 and placement of the pad 22 upon the dental appliance 40 is sufficient to secure pad 22 to the appliance 40.

In further non-limiting examples, adhesive 30 may include pressure-sensitive adhesives based on styrene block copolymers, including those with unsaturated polydiene blocks in the elastomer block. Use also includes linear or radial block copolymers based on polystyrene blocks and polybutadiene blocks and/or polyisoprene blocks, i.e., for example, radial styrene-butadiene $(SB)_n$ and/or linear styrene-butadiene-styrene (SBS) and/or linear styrene-isoprene-styrene (SIS) block copolymers. In other aspects, non-pressure-sensitive adhesives may be used. In other aspects the adhesive 30 is a peel away adhesive such as those adhesives used with adjustable hook-like products where the device such as a hook base (including a Command™Adjustables™ product by 3M Company) is slowly peeled upward from a wall to release the adhesive and the hook product from a wall. In the present case, such peel away adhesive or similar peel away adhesive is used to adhere pad 22 to a dental appliance 40, and accommodates peel away of the pad 22 from the appliance 40 when desired. In aspects the adhesive 30 includes glue dots, or adhesive 30 is made of the same or similar material as are glue dots, such as Scotch Adhesive Dots by 3M Company. In further aspects, adhesive 30 includes very high bond tape, such as 3M 4950 VHB tape. Other adhesives may be used.

Figure 11:
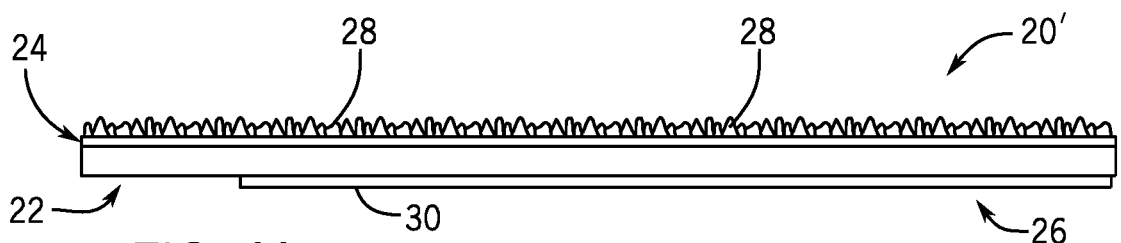
FIG. 11 is a side view of a further aspect of the invention.

FIG. 11 is a side view of device 20' in accordance with a further aspect of the invention. Device 20' includes pad 22 having top surface 24 containing textured or abrasive 28 material. In aspects the material 28 is sand or other matter applied to top surface 24 of pad 22. An adhesive 30 is applied to a bottom surface 26 of pad 22. A peel strip 32 may also be adhered to adhesive 30. In aspects a string may be connected to device 20', whether at a sting port 34 or otherwise. Device 20' may also include a tab 33 or area devoid of adhesive.

Figure 12:
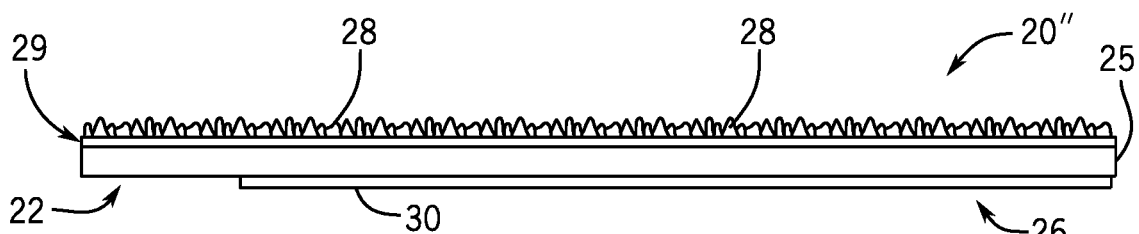
FIG. 12 is a side view of a further aspect of the invention.

FIG. 12 is a side view of device 20″ in accordance with a further aspect of the invention and includes a sandpaper layer 29 connected to another layer, such as a base layer 25, of pad 22, together with adhesive 30 at an opposite side. A peel strip 32 may also be adhered to adhesive 30. In one aspect base layer 25 is a foam layer. It may be appreciated that a variety of layers may be used to create pad 22.

Figure 13:
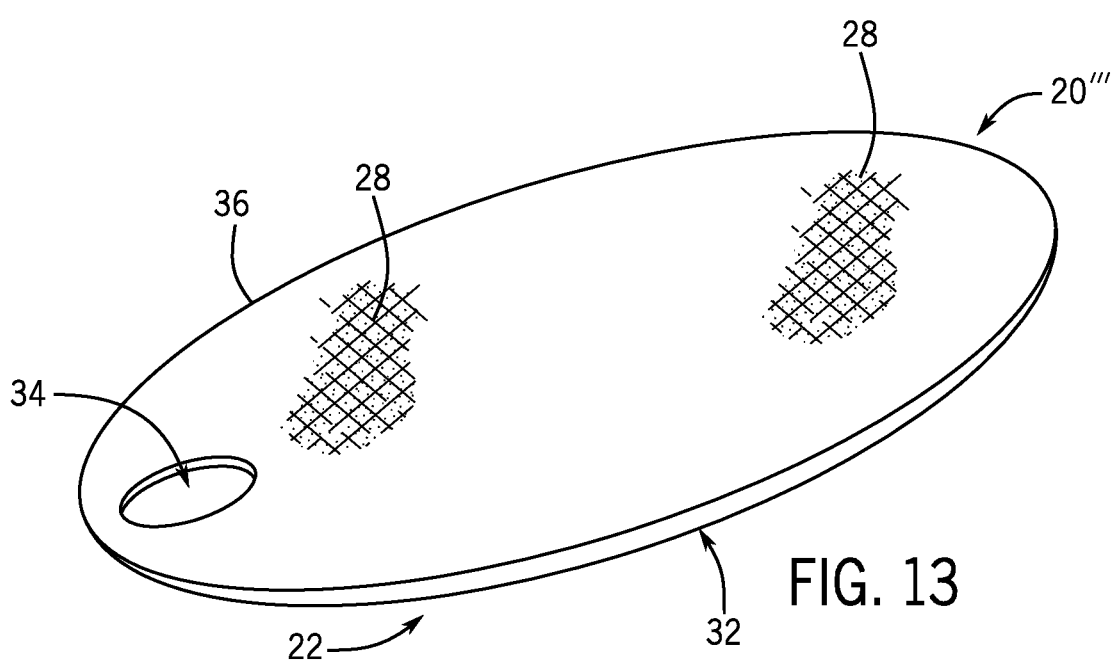
FIG. 13 is a top perspective view of a further aspect of the invention.

FIG. 13 is a top perspective view of device 20‴ in a further aspect of the invention. Device 20‴ includes a top surface having a texture or abrasive 28, and a bottom surface having an adhesive 30. Port 34 is defined by pad 22 and is configured to receive a string 50. Device 20‴ has a perimeter edge 36, which in one aspect is generally oval shaped. A peel strip 32 may also be adhered to adhesive 30.

Figure 14:
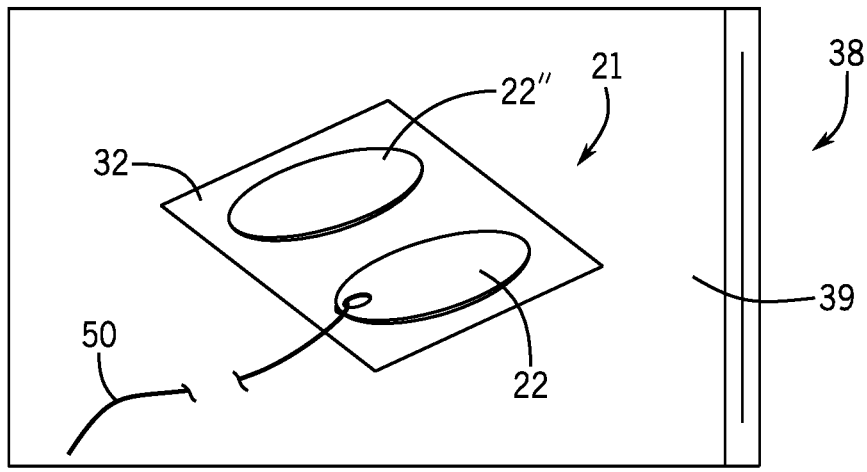
FIG. 14 is a top perspective view of further aspects of the invention.

FIG. 14 is a top perspective view of device 21 in a further aspect of the invention. Device 21 includes a peel strip 32 upon which is positioned a first pad 22 and a second pad 22″. In this aspect pad 22″ has a top side having a texture or abrasive 28, and a bottom side having an adhesive 30 which adhesive 30 is also adhered to peel strip 32. Pad 22″ may be peeled off strip 32 and adhered to a dental appliance 40. In one aspect, pad 22″ lacks a port 34 and a string 50. In further aspects pad 22″ includes a tab 33 which is devoid of adhesive so that pad 22″ may be easily lifted from peel strip 32 and dental appliance 40. Pad 22 in one aspect includes string 50 as shown. In further aspects, device 21 may include first pad 22 and pad 22′. In further aspects, device 21 may include second pad 22″ and pad 22′. Device 21 may be separately packaged in or as a kit 38 or single unit in a package 39 (transparent or otherwise) so that a practitioner may utilize the kit 21 for a single use.

Figure 8:
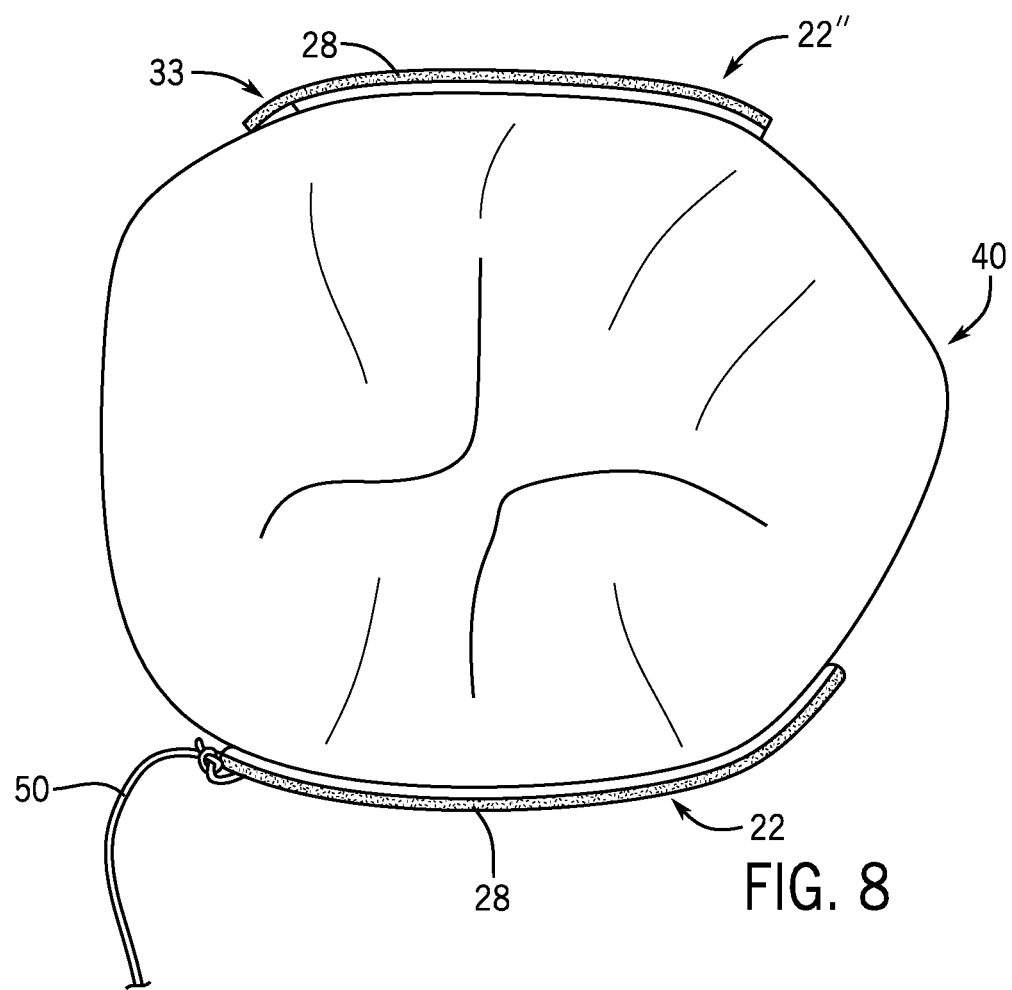
FIG. 8 is a view of the device of FIG. 3 and a further device in accordance with the invention and in conjunction with an example dental restoration or dental appliance.

In one aspect, pad 22 is adhered to a dental appliance 40 as noted above, and a pad 22″ (or pad 22′) is adhered to an opposite side of dental appliance 40 as shown in FIG. 8. With both pad 22 and pad 22″ a practitioner may securely grasp dental appliance 40 and will have the benefit of textured or abrasive sides on both sides of appliance 40. Positioning of pad 22″ at the lingual, or tongue side of the appliance 40 will not interfere during the try-in portion of the procedure. A practitioner may optionally use pad 22‴, pad 22′ or pad 22 (with or without string) at the lingual side as desired.

Figure 15:
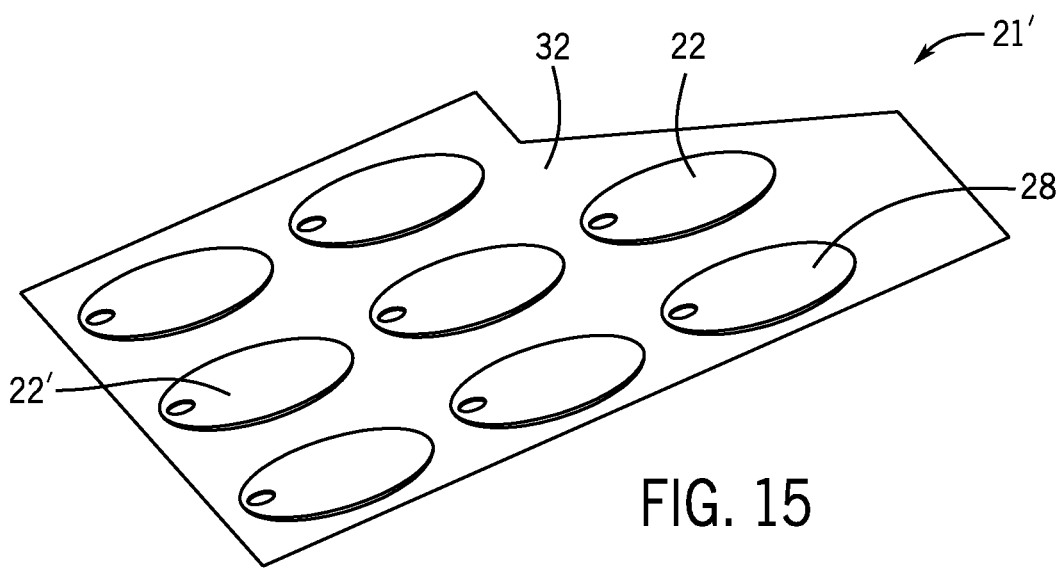
FIG. 15 is a top perspective view of further aspects of the invention.

FIG. 15 is a top perspective view of device 21′ in a further aspect of the invention. Device 21′ includes a peel strip 32 upon which a plurality of pads 22′ are positioned. Pads 22′ include port 34 configured to receive a string 50. In alternatives, pads 22′ may lack a port 34, and in yet further aspects, a string 50 may be secured to pad 22′ whether via port 34 or otherwise. Pads 22′include textured or abrasive 28 on a top side and an adhesive 30 at a bottom side and adhered to peel strip 32. A practitioner may peel a device 22′ from device 21′ and affix the device 22′ to a dental appliance 40, with or without a string 50. A practitioner may add a string 50, or in some aspects strings 50 are provided with each pad 22′.

Figure 16:
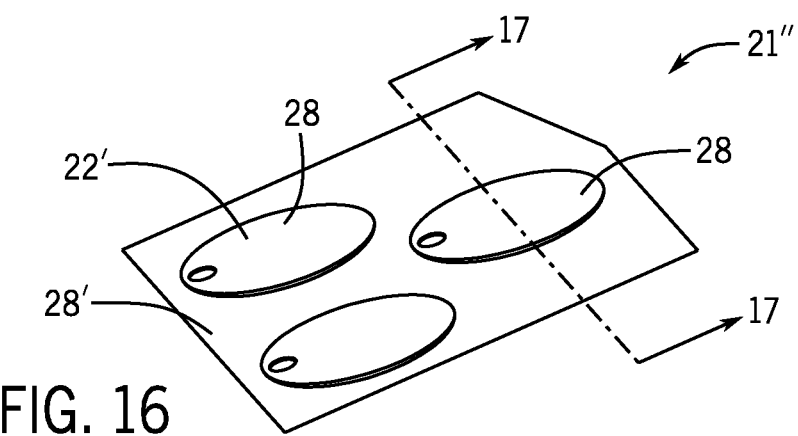
FIG. 16 is a top perspective view of a further aspect of the invention.
Figure 17:
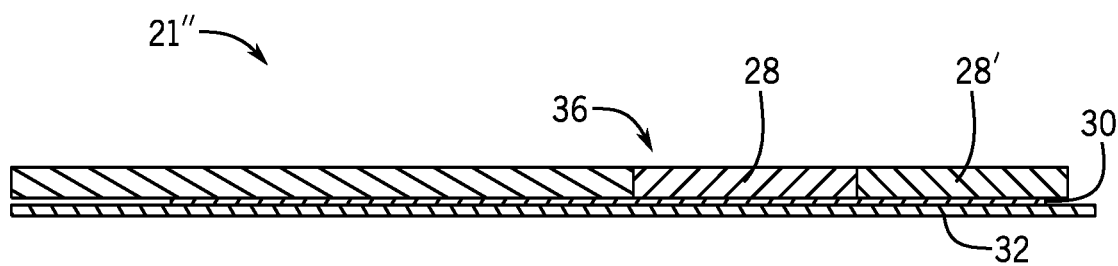
FIG. 17 is a section view taken along line 17-17 of FIG. 16.

FIG. 16 is a top perspective view of device 21″ in a further aspect of the invention. Device 21″ includes a textured or abrasive surface 28′ in which are cut a plurality of pads 22′. Each pad 22′ includes a textured or abrasive 28 top surface. As shown in FIG. 17, which is a section view taken along line 17-17 of FIG. 16, device 21″ includes a peel strip 32 located at a bottom side. In one aspect the plurality of pads 22′ are cut or perforated from abrasive layer 28′, shown generally in one instance with perimeter edge 36 defining a pad 22′. A pad 22″ may be peeled away from layer 28′ and strip 32 and adhered to dental appliance 40. A string may be attached to port 23 of respective pads 22′.

In a further aspect the invention includes a device 20 having a pad 22 having a top surface 24 and a bottom surface 26, at least a portion of the bottom 26 surface being or having an adhesive 30, a peel strip 32 detachably connected to the bottom surface 26 by the adhesive 30, and a string 50 connected to the pad. In one aspect, the adhesive 30 is a pressure sensitive adhesive, and need not be cured and/or light-treated to secure the device 10 to a dental appliance 40. The pad 22 is flexible and planar. In one aspect the pad 22 has a generally rectangular cross-section. In further aspects, a portion of the bottom surface is devoid of adhesive 30. In further aspects the top surface 24 is textured or abrasive 28.

Figure 18:
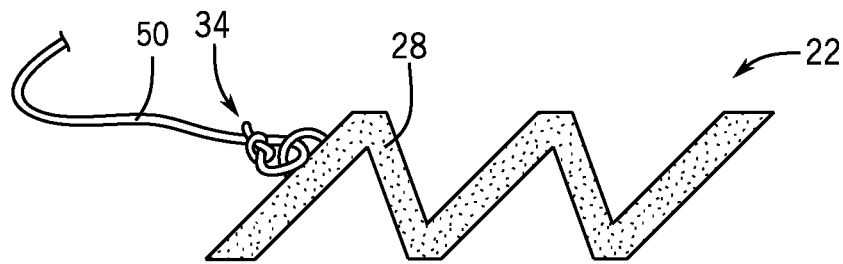
FIG. 18 is a top view of a device in accordance with a further aspect of the invention.
Figure 19:
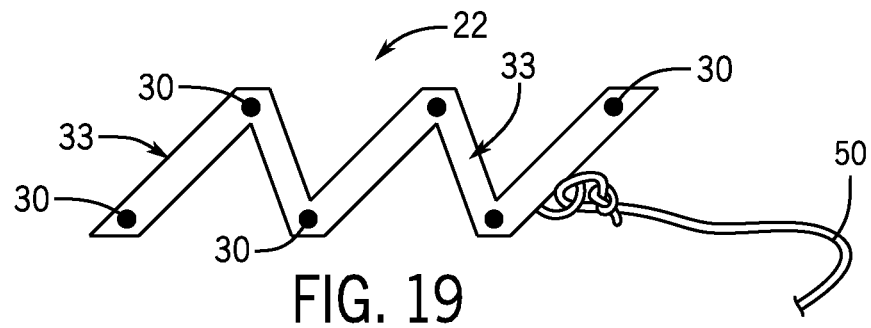
FIG. 19 is a bottom view of the device of FIG. 18.
Figure 20:
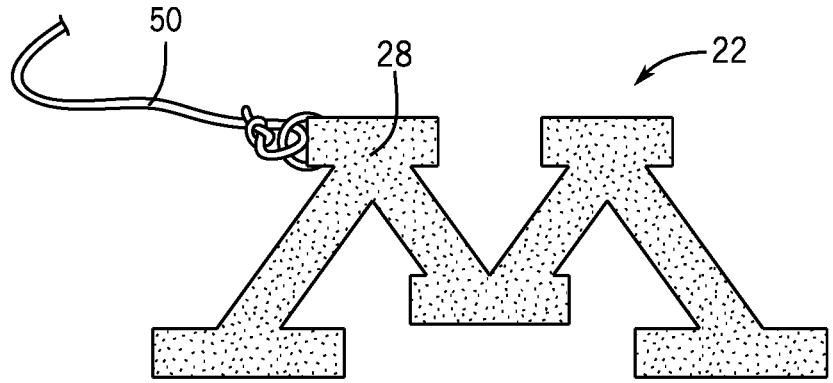
FIG. 20 is a top view of a device in accordance with a further aspect of the invention.
Figure 21:
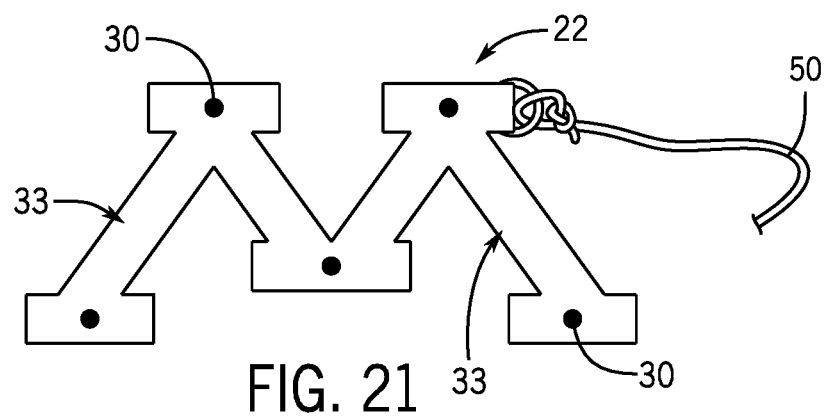
FIG. 21 is a bottom view of the device of FIG. 20.

FIG. 18 includes a further aspect of pad 22 which has a non- linear or generally zig-zag shaped design. The pad 22 of FIG. 18 includes a textured 28 side. A string 50 is connected via port 34. String 50 may also be connected as provided above, with or without a port 34. FIG. 19 is a bottom view of the pad 22 of FIG. 18, and includes a plurality of adhesives 30. In this aspect the plurality of adhesives 30 comprise dots 30. Spaces between the dots 30 include devoid areas 33. Each dot 30 may include a pressure sensitive adhesive. The devoid areas 33 between the dots 30 devoid of adhesive accommodate flex or stretching of pad 20. In aspects material comprising pad 22 or at least part of pad 22 includes stretching material, similar to or the same as material used in adhesive bandages to cover small cuts or skin wounds. Having flex material between adhesive dots 30 provides pad 22 with a stretching characteristic to better adhere the pad 22 to a dental appliance 40 where the non-adhesive areas flex to absorb or resist at least some force between adhesive dots 30 when a pulling force is applied. In some aspects the non-adhesive layer is a mesh of fabric or elastic or other stretch material. Other designs may also be used for pad 22, such as the design shown in FIG. 20 and FIG. 21, or including designs of logos or special characters.

In further aspects the invention includes a method of preparing a dental appliance for insertion into a patient's mouth, including adhering a pad 22 to the appliance 40 as noted above. In aspects the method further includes a step of removing the pad 22 from a peel strip 32 and placing the pad 20 against a side of the appliance 40 and applying a pressure to the pad 20. A further step includes positioning the appliance 40 into a mouth of a patient with the string 50 extending outside the mouth. A further step includes peeling away the pad 22 from the appliance 40 after cementing the appliance 40 into position.

It should be understood, of course, that the foregoing relates to exemplary embodiments of the invention and that modifications may be made without departing from the spirit and scope of the invention as set forth in the following claims.

I claim:

1. A device, comprising:
   a pad having a top surface and a bottom surface, at least a portion of the top surface being a textured surface, at least a portion of the bottom surface being an adhesive, and at least a portion of the bottom surface is devoid of adhesive;
   a peel strip detachably connected to the bottom surface by the adhesive; and
   a string-connection port defined by and extending through the pad from the top surface to the bottom surface;
   whereby the pad is detachable from the peel strip and connectable to a dental restoration or dental appliance for placement into a mouth of a person.

2. The device of claim 1 where the string-connection port is positioned at the at least a portion of the bottom surface devoid of adhesive.

3. The device of claim 1 further comprising a string connected to the pad at the string-connection port.

4. The device of claim 1 where the adhesive is a pressure sensitive adhesive.

5. The device of claim 1 where the adhesive is a stretching releasing adhesive.

6. The device of claim 1 where the top surface comprises an abrasive.

7. The device of claim 1 where the top surface comprises sandpaper.

8. The device of claim 1 where the textured surface is a non-plastic textured surface.

9. The device of claim 1 where the pad has a generally oval perimeter and is configured to attach to a side of a dental crown and entirely within a perimeter of the side of the dental crown.

10. A method comprising peeling the strip from the device of claim 1 and adhering the device to a first side of a dental restoration or dental appliance.

11. The method of claim 10 further comprising a step of adhering a second device to a second side of the dental restoration or dental appliance.

12. The method of claim 11 where the second device includes a textured top surface and a bottom surface having an adhesive.

13. The device of claim 1 where the at least a portion of the bottom surface devoid of adhesive is a tab.

14. The device of claim 13 where the tab extends outward from the adhesive.

15. The device of claim 13 further comprising a string secured to the pad via the string-connection port.

16. The device of claim 1 where the pad has generally uniform thickness.

17. A device, comprising:
a pad having a top surface and a bottom surface, the top surface being an uppermost portion of the device when the pad lays flat, at least a portion of the top surface being textured, at least a portion of the bottom surface having adhesive;
a peel strip detachably connected to the bottom surface by the adhesive; and
a string-connection port defined by and extending through to the pad from the top surface to the bottom surface;
whereby the pad is detachable from the peel strip and connectable to a dental restoration or dental appliance by the adhesive.

18. The device of claim 17 further comprising a string connected to the string-connection port.

19. The device of claim 17 where the pad comprises sandpaper and the adhesive is a stretching release adhesive.

20. The device of claim 17 where the adhesive is a pressure-sensitive adhesive.

21. The device of claim 17 where the pad has a relatively uniform thickness and the top surface is generally planar.

22. The device of claim 17 where an entirety of the bottom surface includes adhesive.

23. A device, comprising:
a pad having a top surface and a bottom surface, at least a portion of the top surface being textured, at least a portion of the bottom surface having an adhesive;
a peel strip detachably connected to the bottom surface by the adhesive;
a string connected to the pad; and
at least a second pad having a textured top surface and an adhesive bottom surface, the second pad detachably connected to the peel strip;
whereby the pad and the at least a second pad are detachable from the peel strip and connectable to a dental restoration or dental appliance by the adhesives.

24. A device, comprising:
a pad having a top surface and a bottom surface, at least a portion of the top surface being rough textured, at least a portion of the bottom surface having an adhesive;
a peel strip detachably connected to the bottom surface by the adhesive;
a string-connection port defined by and extending through the pad from the top surface to the bottom surface; and
at least a second pad having a rough textured top surface and an adhesive bottom surface, the second pad detachably connected to the peel strip;
whereby the pad and the at least a second pad are detachable from the peel strip and connectable to a dental restoration or dental appliance by the adhesives.

* * * * *